US007007909B2

(12) United States Patent
Hsieh (10) Patent No.: US 7,007,909 B2
(45) Date of Patent: Mar. 7, 2006

(54) LOCKING DEVICE FOR A TELESCOPIC TUBE ASSEMBLY

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 10/763,766

(22) Filed: Jan. 23, 2004

(65) Prior Publication Data

US 2005/0161561 A1 Jul. 28, 2005

(51) Int. Cl.
*F16M 11/00* (2006.01)

(52) U.S. Cl. ..................... 248/412; 403/368
(58) Field of Classification Search ............. 248/171, 248/405, 412, 413, 414, 297.51; 403/367, 403/368, 370; 135/75

See application file for complete search history.

(56) References Cited

U.S. PATENT DOCUMENTS

| 2,275,330 A | * | 3/1942 | Tveten ..................... 280/823 |
| 2,508,039 A | * | 5/1950 | Neuwirth ................ 248/188.5 |
| 4,671,479 A | * | 6/1987 | Johnson et al. ............ 248/173 |
| 6,027,087 A | * | 2/2000 | Lindemann et al. ..... 248/188.5 |

* cited by examiner

*Primary Examiner*—Korie Chan
(74) *Attorney, Agent, or Firm*—Jackson Walker, LLP (57) ABSTRACT

A locking device for a telescopic tube assembly having an outer tube and an inner tube slidably received in the outer tube includes a securing ring securable inside the inner tube, a friction element adapted to be securely mounted on one distal end of the inner tube and having legs deformably extending out and a wedge adapted to be selectively and movably received inside the outer tube to force the legs to extend toward an inner periphery of the outer tube so as to increase friction between the legs and the outer tube. Thus movement of the inner tube in the outer tube is selectively controlled.

8 Claims, 8 Drawing Sheets

PRIOR ART

LOCKING DEVICE FOR A TELESCOPIC TUBE ASSEMBLY

BACKGROUND OF THE INVENTION

1. Field of the Invention

The present invention relates to a locking device, and more particularly to locking device for securing an inner tube in an outer tube of a telescopic tube assembly.

2. Description of Related Art

Figure 6:
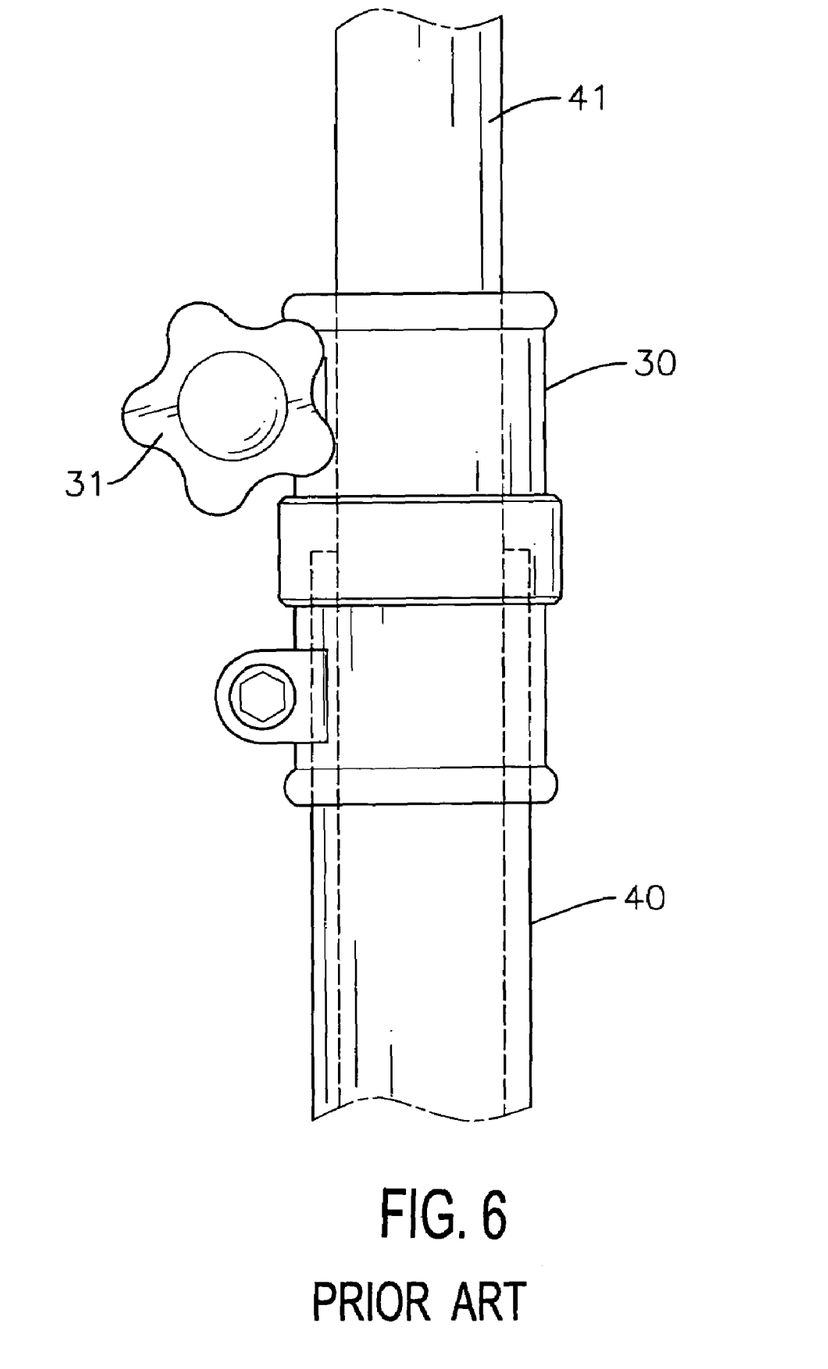
FIG. 6 is a side view showing a conventional locking device used to secure the inner tube inside the outer tube.

With reference to FIG. 6, a conventional locking device (30) for a telescopic tube assembly having an outer tube (40) and an inner tube (41) slidably received in the outer tube (40) includes a knob (31) rotatably mounted on a side of the locking device (30).

When the relative position of the inner tube (41) is to be readjusted in relation to the outer tube (40), the operator has to hold the inner tube (41) to prevent the inner tube (41) from slipping too far into the outer tube (40). Then the operator is able to unscrew the knob (51) and change the relative position of the inner tube (41) to the outer tube (40). However, when a distal end of the inner tube (41) is provided with a heavy load, e.g., an illuminating device, it is impossible for the operator to hold the weight of the illuminating device. Therefore, assistance from the others becomes essential. That is, it is almost impossible for a lone operator to finish the adjustment of the telescopic tube assembly especially when a weighty object is mounted on the top of the telescopic tube assembly.

Figure 7:
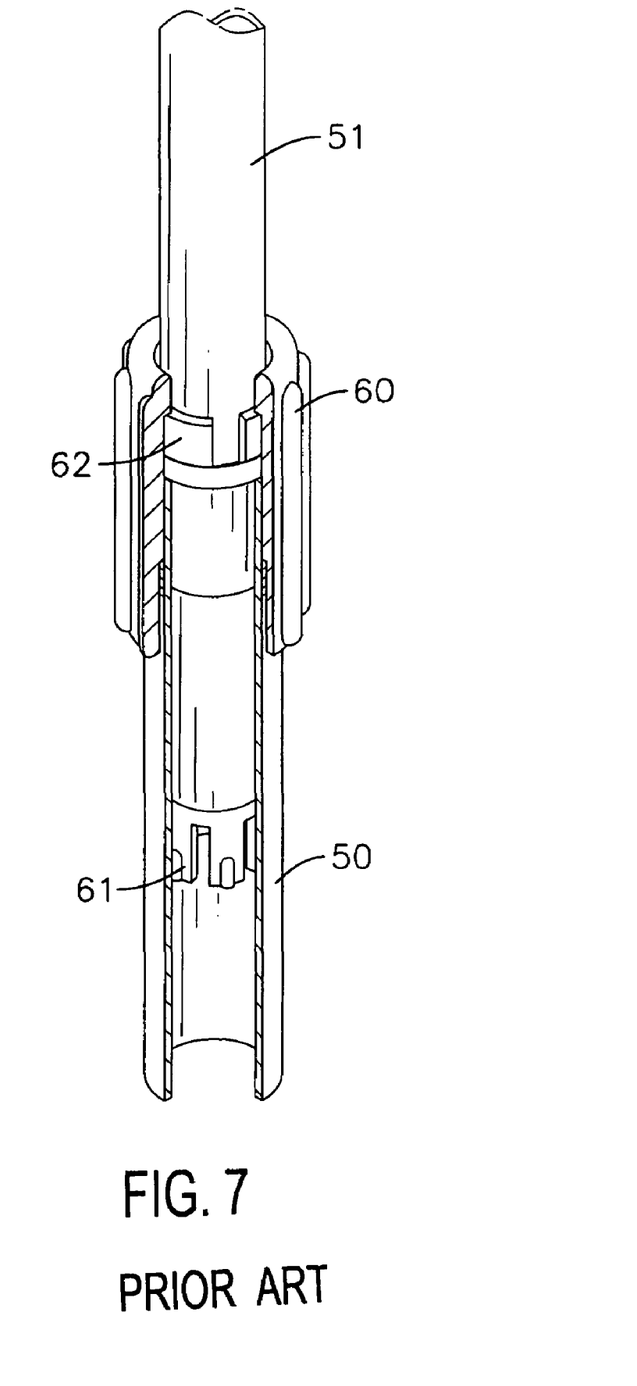
FIG. 7 is a partial cross sectional view of another conventional locking device in the telescopic tube assembly.

With reference to FIG. 7, a second conventional locking device for a telescopic tube assembly having an outer tube (50) and an inner tube (51) slidably received in the outer tube (50) includes a sleeve (60) screwingly connected to the outer tube (50), a stopping sleeve (61) formed on a distal end of the inner tube (51) and a C clip (62) provided between the outer tube (50) and the inner tube (51).

When this conventional locking device is in application, the stopping sleeve (61) engages with an inner face of the outer tube (50) to stop relative movement between the inner tube and the outer tube (50,51). Furthermore, the deformation of the C clip (62) by the rotation of the sleeve (60) enhances the immovability of the inner tube (51) relative to the outer tube (50). Therefore, unscrewing the sleeve (60) enables the operator to adjust the relative position of the inner tube (51) to the outer tube (50).

Figure 8:
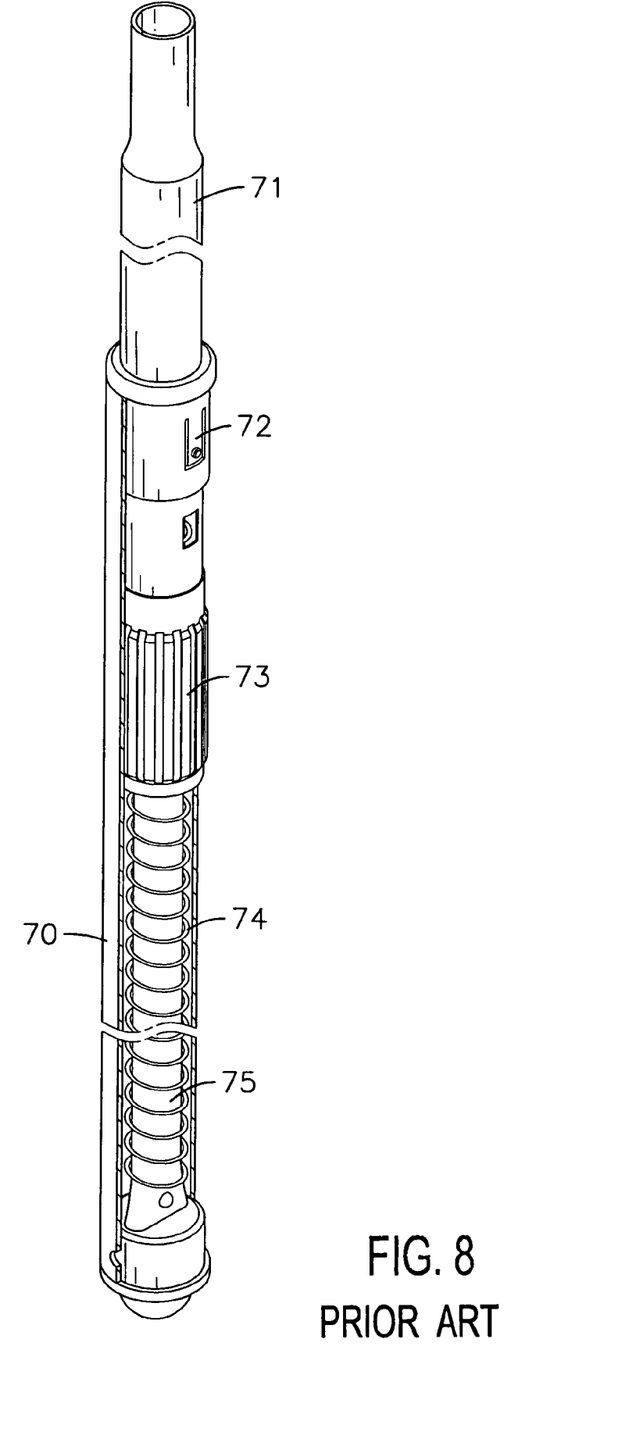
FIG. 8 is a partial cross sectional view showing a further conventional locking device to secure the relative position of the inner tube to the outer tube.

With reference to FIG. 8, another conventional locking device for a telescopic tube assembly having an outer tube (70) and an inner tube (71) slidably received in the outer tube (70) includes an engaging sleeve (72) for preventing the inner tube (71) separating from the outer tube (70), multiple resilient straps (73) mounted on the outer periphery of the inner tube (71) to engage with the inner periphery of the outer tube (70), a spring (74) mounted on the bottom of the inner tube (71) and a muffler (75) received in the outer tube (70) to diminish the noise from the engagement between the resilient straps (73) and the inner periphery of the outer tube (70).

Despite the different structure of the three conventional locking devices, there is a common drawback that hinders the performance of the locking devices. That is, the friction force to prevent the inner tube from falling into the outer tube becomes weaker and weaker each time the relative position between the inner tube and the outer tube is adjusted.

To overcome the shortcomings, the present invention tends to provide an improved locking device to mitigate the aforementioned problems.

SUMMARY OF THE INVENTION

The primary objective of the present invention is to provide an improved locking device to enable the operator to safely finish the adjustment of the relative position of the inner tube relative to the outer tube with ease.

Another objective of the present invention is that the locking device of the present invention is able to increase the friction with the inner periphery of the outer tube so as to support the inner tube inside the outer tube.

Other objects, advantages and novel features of the invention will become more apparent from the following detailed description when taken in conjunction with the accompanying drawings.

DETAILED DESCRIPTION OF THE PREFERRED EMBODIMENT

Figure 1:
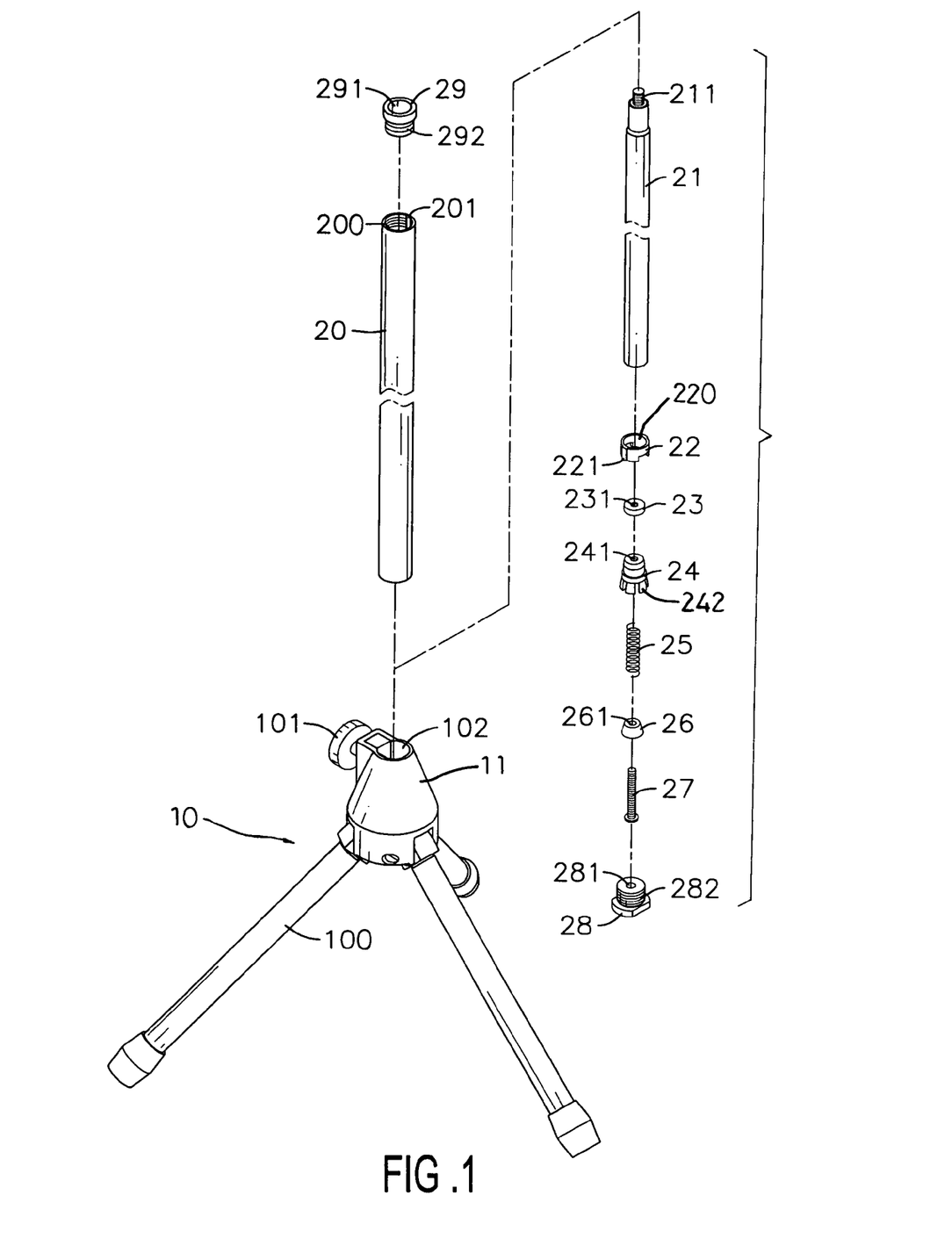
FIG. 1 is an exploded perspective view of the locking device applied on a stand.
Figure 2:
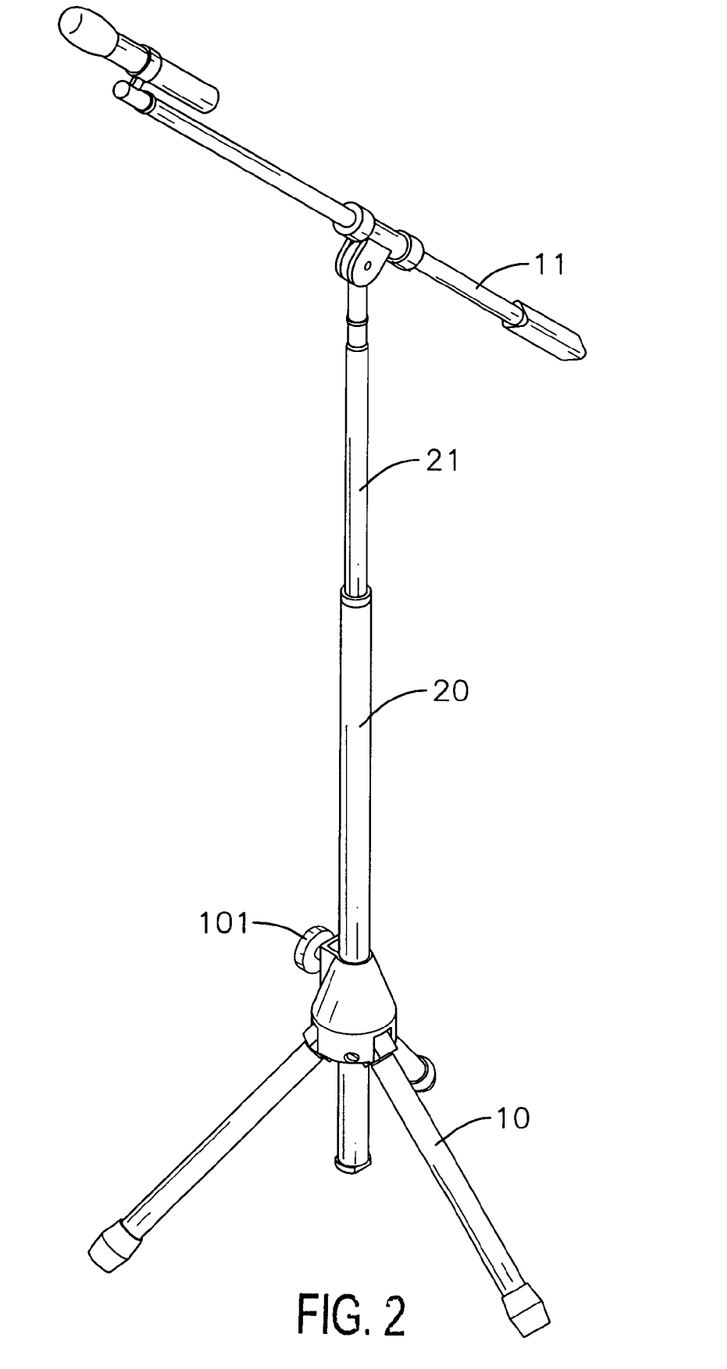
FIG. 2 is schematic perspective view showing that the telescopic tube assembly is used to support a microphone and is supported by the stand.

With reference to FIGS. 1 and 2, a telescopic tube assembly includes an outer tube (20) and an inner tube (21) slidably received in the outer tube (20). The outer tube (20) has inner threading (200) formed on an inner periphery of the outer tube (20) and a guiding groove (201) defined in opposite sides of the inner periphery of the outer tube (20). The inner tube (21) has a threaded rod (211) formed on and extending out of a distal end of the inner tube (21).

A locking device in accordance with the present invention includes a guiding ring (22), a securing ring (23), a friction element (24), a spring (25), a wedge (26) and a bolt (27). A top cap (29) and a bottom cap (28) are provided to respective openings of the outer tube (20).

The guiding ring (22) has a first through hole (220) defined through the guiding ring (22) and a guide (221) formed on opposite outer peripheries of the guiding ring (22) to correspond to the guiding grooves (201). The securing ring (23) is provided with a threaded hole (231) defined to correspond to the bolt (27). The friction element (24) has a first through hole (241) to correspond to the bolt (27) and multiple legs (242) deformably formed on and extending out of the friction element (24). The wedge (26) has a second through hole (261) defined to correspond to the bolt (27).

The top cap and the bottom cap (29,28) both have a through hole, namely, the third through hole (291) and fourth through hole (281), and an outer threading (292,282) formed to correspond to the inner threading (200) of the outer tube (20).

A stand (10) with multiple extensions (100) extending out from a body (11) has a knob (101) rotatably mounted on a side of the body (11) and an insertion hole (102) defined to correspond to a distal end of the outer tube (20).

Figure 3:
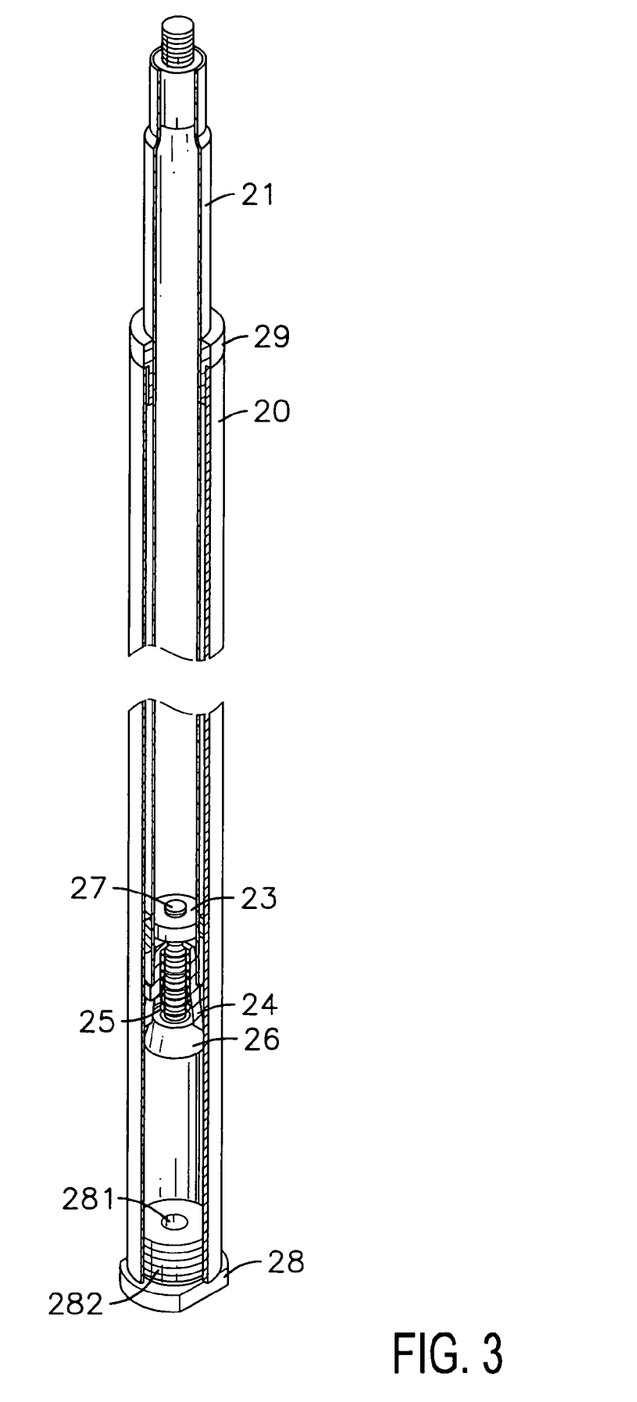
FIGS. 3, 4 and 5 are partial cross sectional views showing the application of the locking device of the present invention inside the inner tube and the outer tube.
Figure 4:
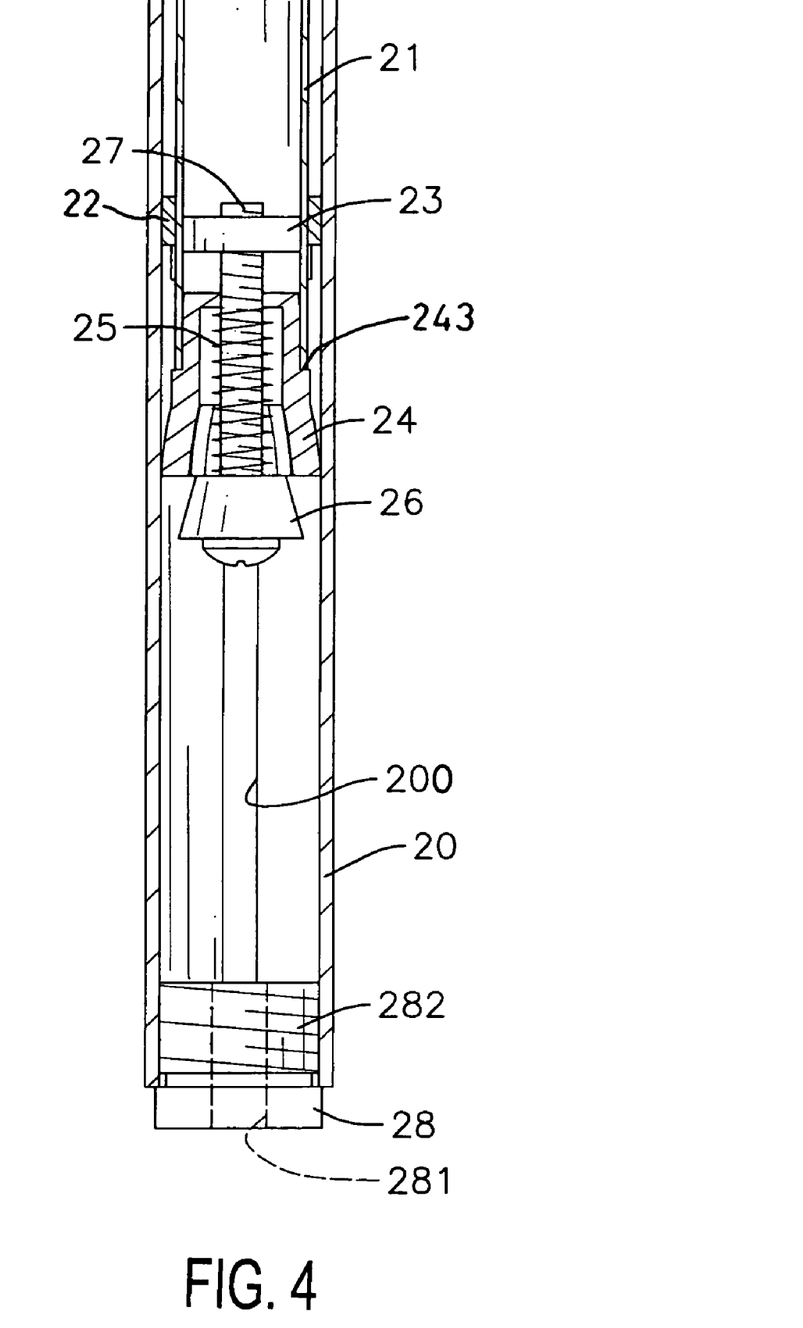
Figure 5:
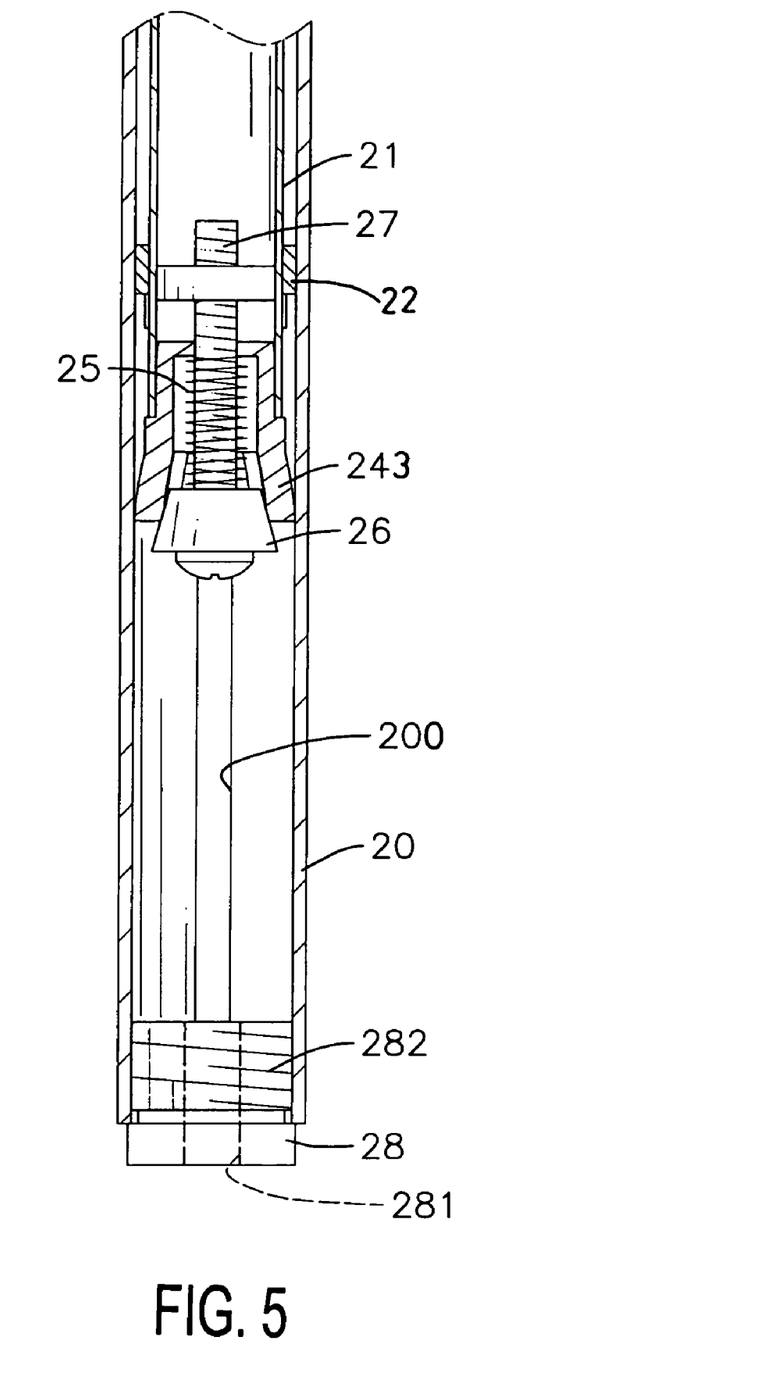

With reference to FIGS. 3, 4 and 5, when the locking device of the present invention is assembled, it is noted that the guiding ring (22) is securely mounted on an upper portion of the inner tube (21) and the securing ring (23) is securely received in the inner tube (21) such that the securing ring (23) is immovable relative to the inner tube (21). Thereafter, the bolt (27) is extended through the second through hole (261) of the wedge (26), the spring (25), the first through hole (241) of the friction element (24) and the threaded hole (231) of the securing ring (23). Then the assembly is received in the outer tube (20), and the top cap (29) and the bottom cap (28) are respectively applied to the opening (not numbered) of the outer tube (20) to prevent the inner tube from slipping out of the outer tube (20). It is noted that to secure the engagement between the top cap (29) and the outer tube (20) and the engagement between the bottom cap (28) and the outer tube (20), both the top and bottom caps (29,28) are provided with the outer threading (292,282) formed on outer peripheries of the top and bottom caps (29,28) to correspond to and screwingly engage with the inner threading (200) of the outer tube (20). After the extension of the bolt (27) through the wedge (26), the spring (25), the friction element (24) and into the securing ring (23), it is noted that the friction element (24) has an upper portion securely fitted into the inner tube (21) and a shoulder (243) formed on an outer periphery of a mediate portion of the friction element (24) to abut a peripheral edge of the inner tube (21). Therefore, when the operator is using a tool (not shown), preferably a screwdriver, to rotate the bolt (27) from the fourth through hole (281) of the bottom cap (28), due to the bolt (27) being screwingly engaged with the threaded hole (231) of the securing ring (23), movement of the bolt (27) toward the securing ring (23) forces the wedge (26) to move toward the friction element (24). As a result, the legs (242) are forced to extend toward the inner periphery of the outer tube (20). With further movement of the wedge (26) towards the friction element (24), the friction between the legs (242) and the outer tube (20) becomes larger. Therefore, the inner tube (21) becomes immovable relative to the outer tube (20).

In order to readjust relative position of the inner tube (21) to the outer tube (20), the operator gradually unscrews the bolt (27) to lessen the friction with the inner periphery of the outer tube (20) such that the inner tube (21) is movable relative to the outer tube (20). After the inner tube (21) is moved to a proper position, the operator screws the bolt (27) to force the legs (242) to extend and thus the friction between the legs (242) and the inner periphery of the outer tube (20) is able to support the weight of the inner tube (21). When readjustment of the inner tube (21) to the outer tube (20) is required, the bolt (27) is moved backward, which lessens the driving force to the wedge (26). Therefore, the force from the spring (25) expedite the movement of the wedge (26) away from the friction element (24) and therefore the friction between the legs (242) and the inner periphery of the outer tube (20) is reduced.

Referring to FIG. 2, it is noted that when there is a load on top of the inner tube (21), the friction between the legs (242) and the inner periphery of the outer tube (20) is able to support the total weight of the inner tube (21) and the weight of an additional device, such as a microphone assembly (11).

Furthermore, while the inner tube (21) is moving inside the outer tube (20), the guide (221) is also moved along the guiding grooves (200) inside the outer tube (20) to smoothen the movement of the inner tube (21) to the outer tube (20).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for a telescopic tube assembly having an outer tube and an inner tube slidably received in the outer tube, the locking device comprising:
    a securing ring securable inside the inner tube, wherein a guiding ring is securable on the inner tube such that when the inner tube is moved inside the outer tube, movement of the inner tube relative to the outer tube is smoothened due to a guide formed on the guiding ring being slidable in a guiding groove in the outer tube;
    a friction element adapted to be securely mounted on one distal end of the inner tube and having legs deformably extending out; and
    a wedge adapted to be selectively and movably received inside the outer tube to force the legs to extend toward an inner periphery of the outer tube so as to increase friction between the legs and the outer tube and thus slidable movement of the inner tube in the outer tube is selectively prevented.

2. The locking device as claimed in claim 1 further comprising a bolt extending through the wedge, the friction element and screwingly into the securing ring such that rotation of the bolt is able to force the wedge to move toward the friction element and to force the legs to extend.

3. The locking device as claimed in claim 2, wherein a spring is sandwiched between the wedge and the friction element to provide a force to the wedge when a bolt is moved with the wedge.

4. The locking device as claimed in claim 3 further comprising a top cap and a bottom cap adapted to be respectively fitted into two openings of the outer tube so as to prevent the inner tube escaping from the outer tube.

5. The locking device as claimed in claim 2 further comprising a top cap and a bottom cap adapted to be respectively fitted into two openings of the outer tube so as to prevent the inner tube escaping from the outer tube.

6. The locking device as claimed in claim 1, wherein a spring is sandwiched between the wedge and the friction element to provide a force to the wedge when a bolt is moved with the wedge.

7. The locking device as claimed in claim 6 further comprising a top cap and a bottom cap adapted to be respectively fitted into two openings of the outer tube so as to prevent the inner tube escaping from the outer tube.

8. The locking device as claimed in claim 1 further comprising a top cap and a bottom cap adapted to be respectively fitted into two openings of the outer tube so as to prevent the inner tube escaping from the outer tube.

* * * * *